(12) United States Patent
Sin et al.

(10) Patent No.: US 6,700,738 B1
(45) Date of Patent: Mar. 2, 2004

(54) READ/WRITE HEAD COIL TAP HAVING UPPER AND LOWER PORTIONS

(76) Inventors: Kyusik Sin, 2831 Daylily Ct., Pleasanton, CA (US) 94588; Yingjian Chen, 34759 Bowie Common, Fremont, CA (US) 94555

( * ) Notice: Subject to any disclaimer, the term of this patent is extended or adjusted under 35 U.S.C. 154(b) by 171 days.

(21) Appl. No.: 09/810,819

(22) Filed: Mar. 16, 2001

(51) Int. Cl.⁷ .............................. G11B 5/17; G11B 5/147
(52) U.S. Cl. ....................................... 360/126; 360/123
(58) Field of Search ................................. 360/126, 125, 360/123, 110

(56) References Cited

U.S. PATENT DOCUMENTS

| | | | |
|---|---|---|---|
| 3,681,682 A | 8/1972 | Cox et al. ................. 324/34 R |
| 3,787,964 A | 1/1974 | Simon et al. ................. 29/603 |
| 4,143,458 A | 3/1979 | Gibson ..................... 29/603.12 |
| 4,155,106 A | 5/1979 | Muraoka et al. | |
| 4,188,599 A | 2/1980 | Papa .......................... 333/219 |
| 4,191,983 A | 3/1980 | Gibson ........................ 360/125 |
| 4,583,143 A | 4/1986 | Tabei ........................ 360/123 |
| 4,949,209 A | 8/1990 | Imanaka et al. ............. 360/126 |
| 5,166,845 A | 11/1992 | Thompson et al. ...... 360/234.3 |
| 5,218,755 A | 6/1993 | Gassen et al. ........... 29/603.09 |
| 5,224,003 A | 6/1993 | Matsui ........................ 360/126 |
| 5,761,013 A | 6/1998 | Lee et al. .................... 360/126 |
| 5,764,451 A | 6/1998 | Katz .......................... 360/123 |
| 5,764,453 A | 6/1998 | Postma et al. | |
| 5,816,890 A | 10/1998 | Hao et al. ....................... 451/5 |
| 5,870,262 A * | 2/1999 | Ikegawa et al. ............ 360/126 |
| 5,913,550 A | 6/1999 | Watanuki .................... 29/603.1 |
| 5,923,506 A * | 7/1999 | Herrera ....................... 360/126 |
| 6,038,109 A | 3/2000 | Ogata et al. ................. 360/123 |
| 6,462,915 B1 * | 10/2002 | Sasaki ......................... 360/317 |

* cited by examiner

Primary Examiner—Julie Anne Watko (57) ABSTRACT

A thin film read/write head with a high performance inductive write section that incorporates a single layer coil with an improved fabrication method of a center tab of the single layer coil. The center tab is formed before the main body of the single layer coil is formed. Several advantages can thus be achieved. The coil resistance and inductance can be monitored for all the devices immediately after the coil fabrication to improve yield by identifying additional processing or rework before final production. Several conventional wafer processing steps can be eliminated, thereby shortening the cycle time of wafer processing. The chance of corrosion or delamination of the second pole P2 is significantly reduced.

10 Claims, 12 Drawing Sheets

READ/WRITE HEAD COIL TAP HAVING UPPER AND LOWER PORTIONS

FIELD OF THE INVENTION

The present invention relates in general to data storage systems such as disk drives, and it particularly relates to a thin film read/write head for use in such data storage systems. More specifically, the present invention relates to a thin film, inductive-type advanced read/write head with a single layer coil and an improved method of fabricating a center tab of the single layer coil.

BACKGROUND OF THE INVENTION

In a conventional magnetic storage system, a thin film magnetic head includes an inductive read/write element mounted on a slider. The magnetic head is coupled to a rotary actuator magnet and a voice coil assembly by a suspension and an actuator arm positioned over a surface of a spinning magnetic disk. In operation, a lift force is generated by the aerodynamic interaction between the magnetic head and the spinning magnetic disk. The lift force is opposed by equal and opposite spring forces applied by the suspension such that a predetermined flying height is maintained over a full radial stroke of the rotary actuator assembly above the surface of the spinning magnetic disk.

An exemplary magnetic head includes a thin film write head with a bottom pole (P1) and a top pole (P2). The poles P1 and P2 have a pole tip height dimension commonly referred to as "throat height". In a finished write head, the throat height is measured between an air bearing surface ("ABS"), formed by lapping and polishing the pole tip, and a zero throat level where the pole tip of the write head transitions to a back region. A pole tip region is defined as the region between the ABS and the zero throat level. Each of the poles P1 and P2 has a pole tip located in the pole tip region. The tip regions of the poles P1 and P2 are separated by a magnetic recording gap, which is a thin layer of insulation material.

Figure 4:
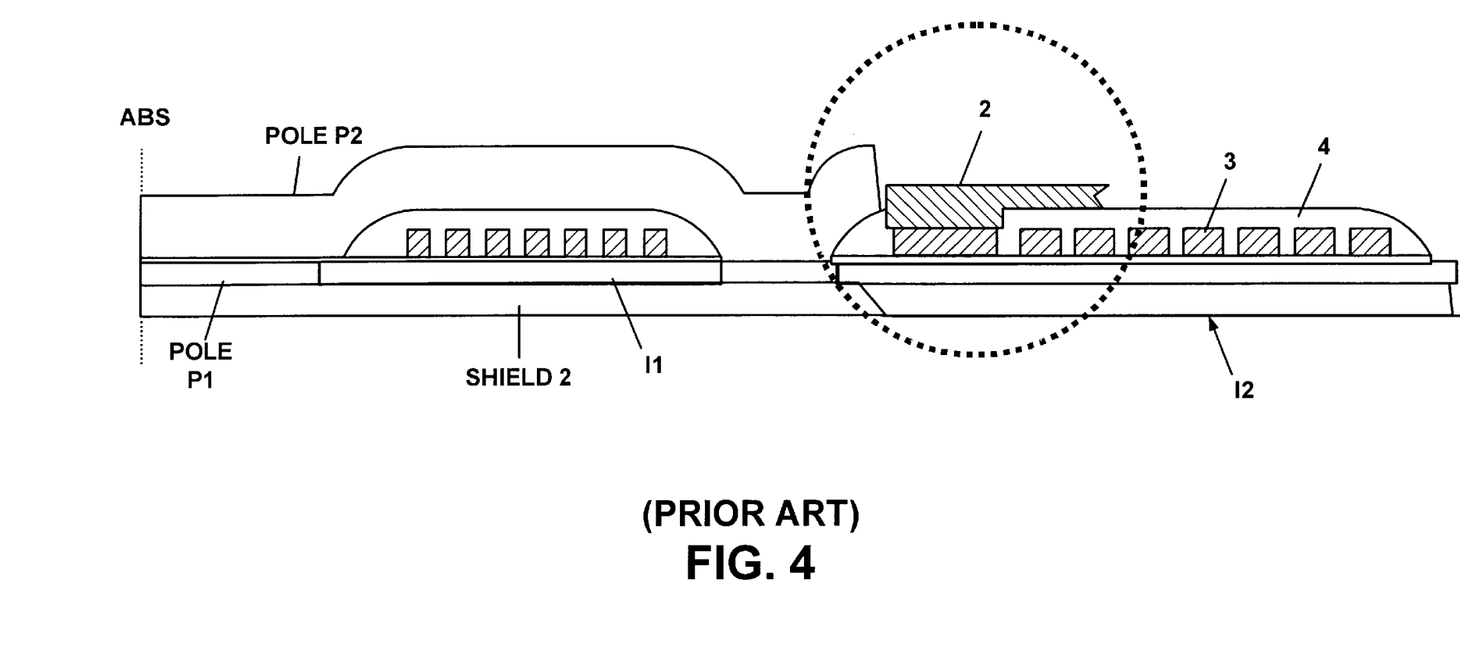
FIG. 4 is a cross-sectional, partly fragmentary view of a conventional write head (without the read element), shown positioned relative to a data storage medium.

In conventional head designs, as illustrated by FIG. 4, a center tab 2 is formed typically after the main coil body 3, the insulating layer 4, and the P2 pole have been formed. As a result, the coil resistance and inductance of the write head cannot be readily monitored once the coil fabrication is completed.

In conventional head designs, a limited number of coil test sites (dummy coils) are available for probing following the fabrication of the coil main body. In which case, only the coil resistance can be measured because the dummy coil structure does not represent the real coil. Such a test is inaccurate as it leaves the coil yield largely unknown until the final probing test which is implemented at around the end of the wafer processing. Thus, it is difficult to monitor and to improve the coil yield, which is critical for the write head performance.

Furthermore, in conventional designs the center tab process requires several wafer processing steps such as target window seed removal (photolithography and wet etch), center tab fabrication (photolithography, plating, and wet etch of seed), and so forth.

While attempts have been made, though not completely satisfactorily, to alleviate the two former concerns, as exemplified by U.S. Pat. No. 5,649,351 to Wade et al., which is incorporated herein by reference, the concerns associated with the fabrication of the center tab of the single layer coil have not been adequately addressed.

SUMMARY OF THE INVENTION

One aspect of the present invention is to satisfy the long felt, and still unsatisfied need for a thin film read/write head with a single layer coil, and an improved fabrication process of the center tab of the single layer coil that reduces the complexity of the wafer processing, which would result in a shorter cycle time as demanded by the need for a faster design-to-market cycle.

According to the present invention, the center tab is formed prior to the fabrication of the coil main body, the insulating layer, and the pole P2. This new fabrication method increases the manufacturing yield and eliminates several wafer processing steps, thereby significantly reducing the cycle time of wafer processing.

BRIEF DESCRIPTION OF THE DRAWINGS

The features of the present invention and the manner of attaining them, will become apparent, and the invention itself will be understood by reference to the following description and the accompanying drawings, wherein:

FIG. 7 is an ABS view of the read/write head of the present invention. Similar numerals in the drawings refer to similar elements. It should be understood that the sizes of the different components in the figures might not be in exact proportion, and are shown for visual clarity and for the purpose of explanation.

DETAILED DESCRIPTION OF PREFERRED EMBODIMENTS

Figure 1:
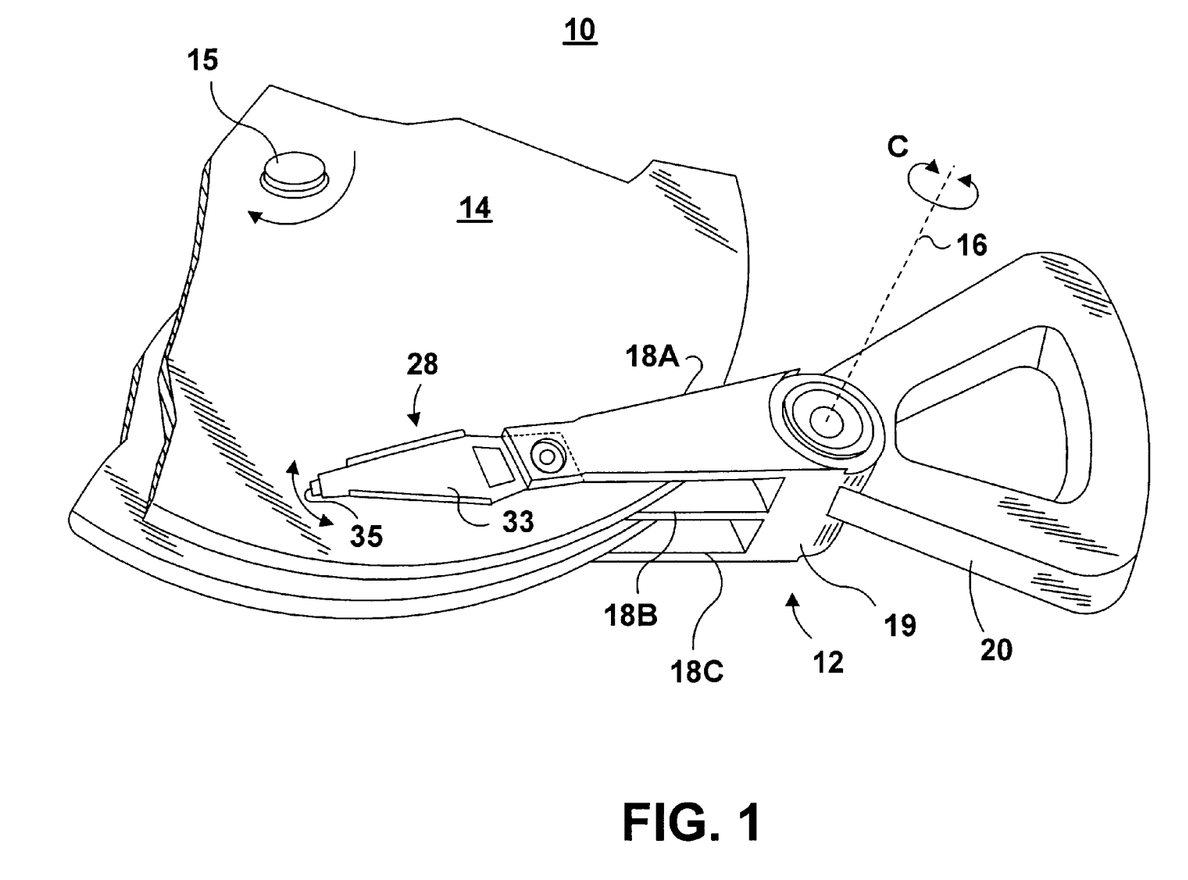
FIG. 1 is a fragmentary perspective view of a data storage system utilizing a read/write head according to the invention.

FIG. 1 illustrates a disk drive 10 comprised of a head stack assembly 12 and a stack of spaced apart magnetic data storage disks or media 14 that rotate about a common shaft 15. The head stack assembly 12 is pivoted about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
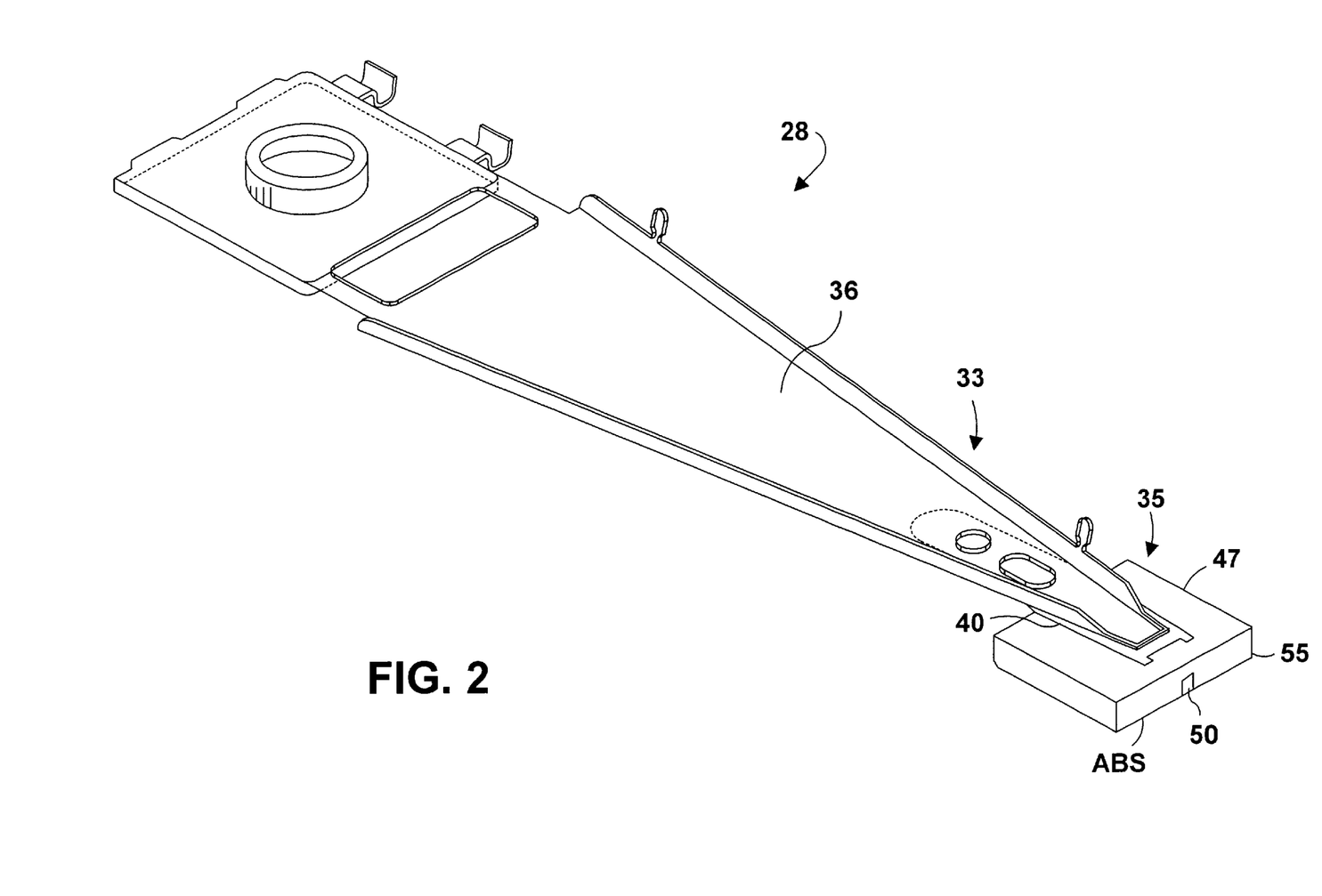
FIG. 2 is a perspective view of a head gimbal assembly comprised of a suspension, and a slider to which the read/write head of the present invention is secured, for use in a head stack assembly.

A head gimbal assembly (HGA) 28 is secured to each of the actuator arms, for instance 18A. With reference to FIG. 2, the HGA 28 is comprised of a suspension 33 and a read/write head 35. The suspension 33 includes a resilient load beam 36 and a flexure 40 to which the head 35 is secured.

The head 35 is formed of a slider 47 secured to the free end of the load beam 36 by means of the flexure 40, and a read/write element 50 supported by the slider 47. In the example illustrated in FIG. 2, the read/write element 50 is secured to the trailing edge 55 of the slider 47. The slider 47 can be any conventional or available slider.

Figure 3:
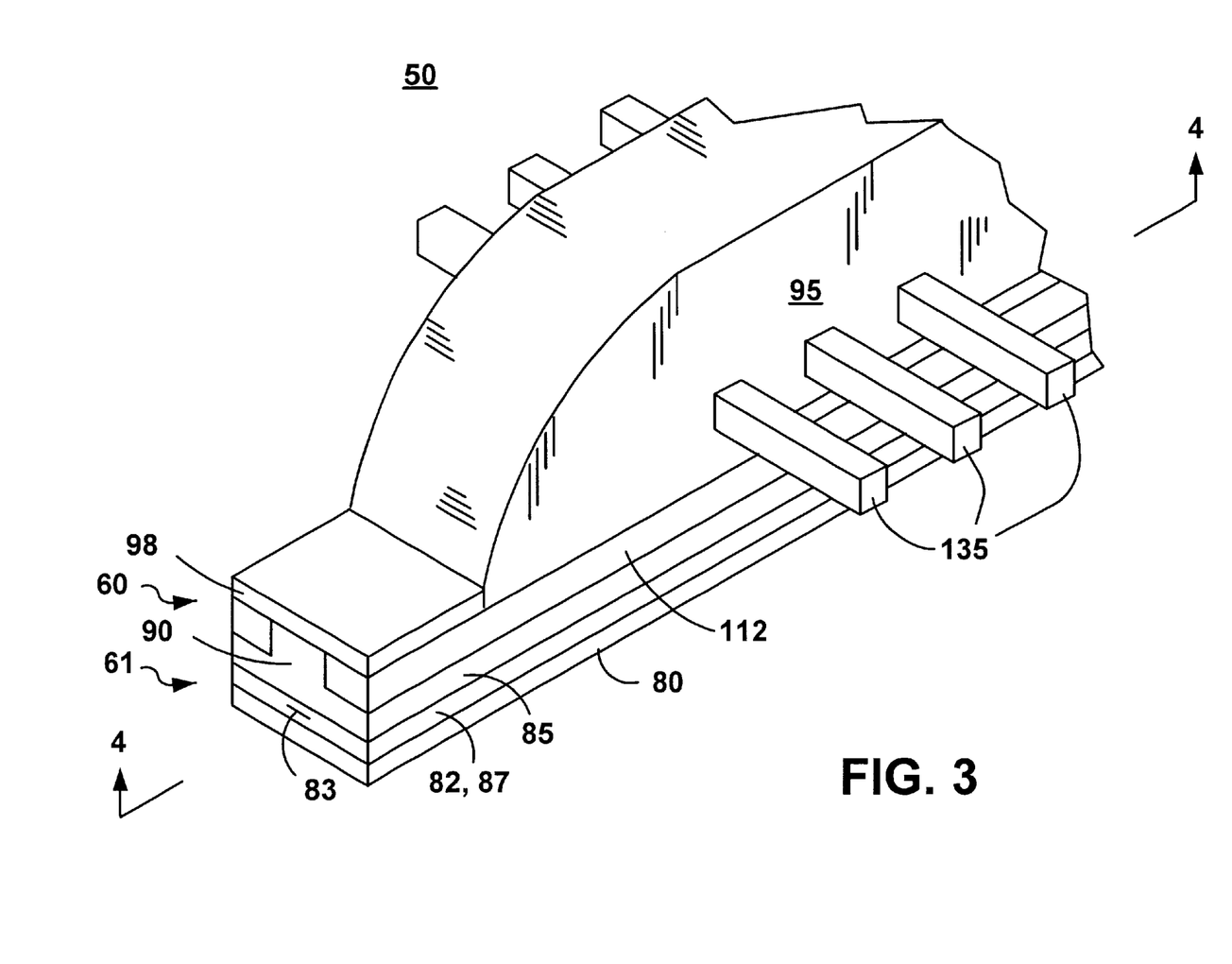
FIG. 3 is an enlarged perspective view of a thin film read/write element (with the top yoke removed for clarity of illustration) forming part of the read/write head of FIGS. 1 and 2, and made according to the present invention.
Figure 7:
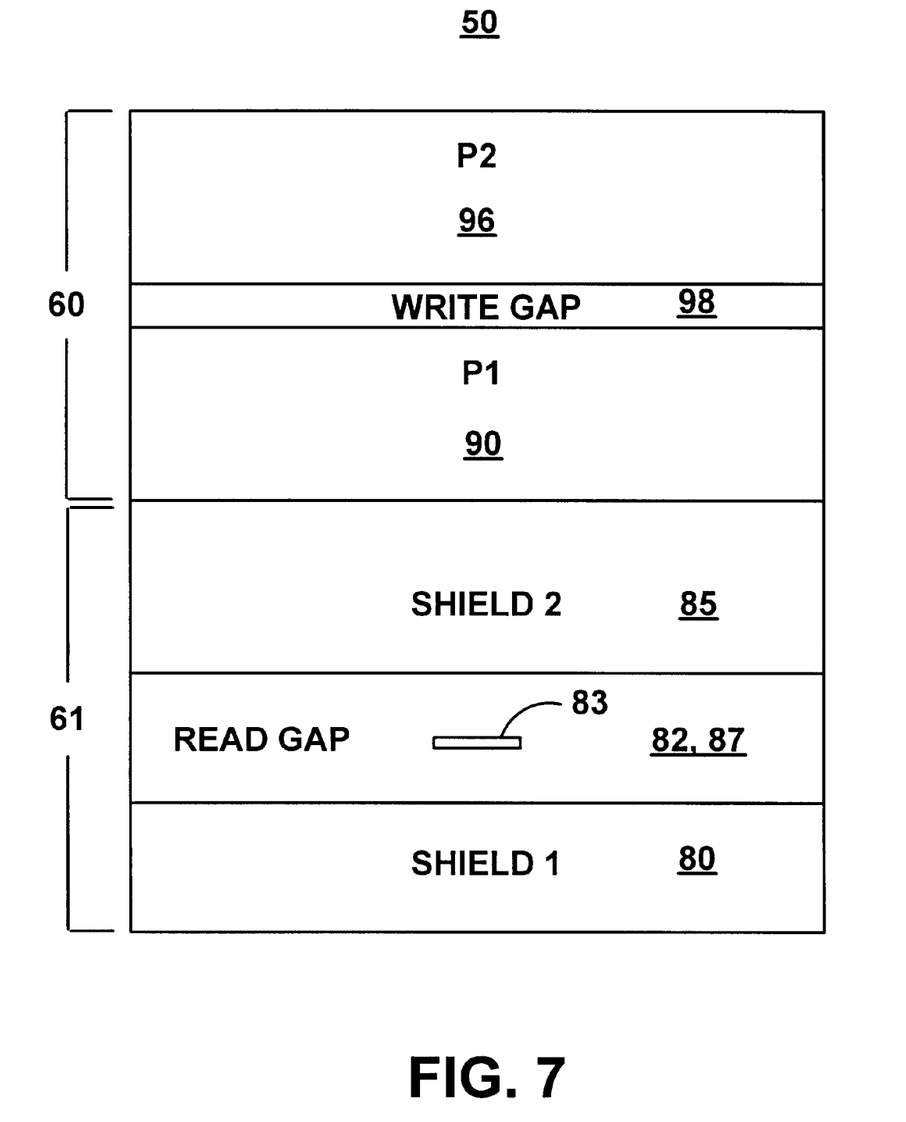

The read/write element 50 will now be described in detail with reference to FIGS. 3, 5 and 7. The read/write element 50 integrates a write section 60 and a read section 61. The read section 61 is formed of a first shield layer (Shield 1) 80 preferably made of a material that is both magnetically and electrically conductive. For example, the first shield layer 80 can have a nickel-iron (NiFe) composition, such as Permalloy, or a ferromagnetic composition with high permeability. The thickness of the first shield layer 80 can be in the range of approximately 0.5 micron to approximately 14 microns.

An insulating layer 82 is formed over substantially the entire surface of the first shield layer 80 to define a non-magnetic, transducing read gap 87. The insulation layer can be made of any suitable material, for example alumina ($Al_2O_3$), aluminum oxide or silicon nitride. The read section 61 is also comprised of a read sensor 83 formed within the insulation layer 82. The read sensor 83 can be any suitable sensor, including but not limited to a magnetoresistive (MR) element, a giant magnetoresistive (GMR) element, a spin valve, or a Current In the Plane mode (CIP) sensor.

If, for example, a GMR element were used, it can be formed, by way of example, by depositing a plurality of alternating ultra-thin layers of magnetically conductive and nonconductive materials such as Permalloy (Ni80 Fe20) and copper (Cu), each layer being approximately 10 to 30 angstroms thick. The electric resistance of the GMR element 83 fluctuates when exposed to a time-varying magnetic flux. Unlike inductive transducers, a magnetoresistive element is sensitive to the magnitude of a flux transition rather than to the rate of change of the flux transition. This gives the magnetoresistive element 83 certain advantages over inductive transducers, such as insensitivity to disk speed changes. The overall thickness of the GMR element 83 can be in the range of approximately 30 angstroms to approximately 3000 angstroms.

The read section 61 is also comprised of a second shield layer (Shield 2) 85 that is made of an electrically and magnetically conductive material, which may be similar or equivalent to that of the first shield layer 80. The second shield layer 85 is formed over substantially the entire surface of the insulating layer 82, and has a thickness that can be substantially similar or equivalent to that of the first shield layer 80. The second shield layer 85 terminates at a sloped back edge 120.

A read circuit 102 (not shown) is connected to the first shield layer 80 and the second shield layer 85, such that during a read mode the read circuit sends a sensing electric current $I_R$ through the sensor 83 and the second shield layer 85. The read-sense current $I_R$ flows perpendicularly through the sensor 83, thus avoiding the along-the plane electromigration problems and magnetic-biasing due to parallel-current problems associated with earlier designs based on CIP operation (Current In the Plane mode). Reference is made to U.S. Pat. Nos. 5,576,914 and 5,446,613 that are incorporated herein by reference, and which describe the operation of a magnetic read/write head.

The write section 60 is comprised of a first pole layer or pedestal P1 (also referenced by the numeral 90) that extends, for example, integrally from the second shield layer 85. The pedestal P1 includes a back edge 92 that defines the zero throat level with extreme accuracy. In a preferred embodiment, the pedestal P1 extends only to the zero throat 92.

A write coil 135 includes a plurality of a plurality of conductive coil elements (or conductors) 135A, only a few of which are illustrated and also form part of the write section 60. The coil elements 135A are formed within an insulating layer 95. The single layer write coil 135 can preferably have, for example, 1 to 30 turns, though a different number of turns can alternatively be selected depending on the application or design.

A second pole layer 96 is made of a magnetically conductive material, and be for example only, similar or equivalent to that of the first shield layer 80 and the first pole layer 85. The second pole layer 96 is formed over, and is separated from the pedestal 90, to define a write gap 114 therewith. The thickness of the second pole layer 96 can be substantially the same as, or similar to that of the first shield layer 80. The write gap 114 can be filled with a material similar or equivalent to that of the insulating layer 82.

Figure 5:
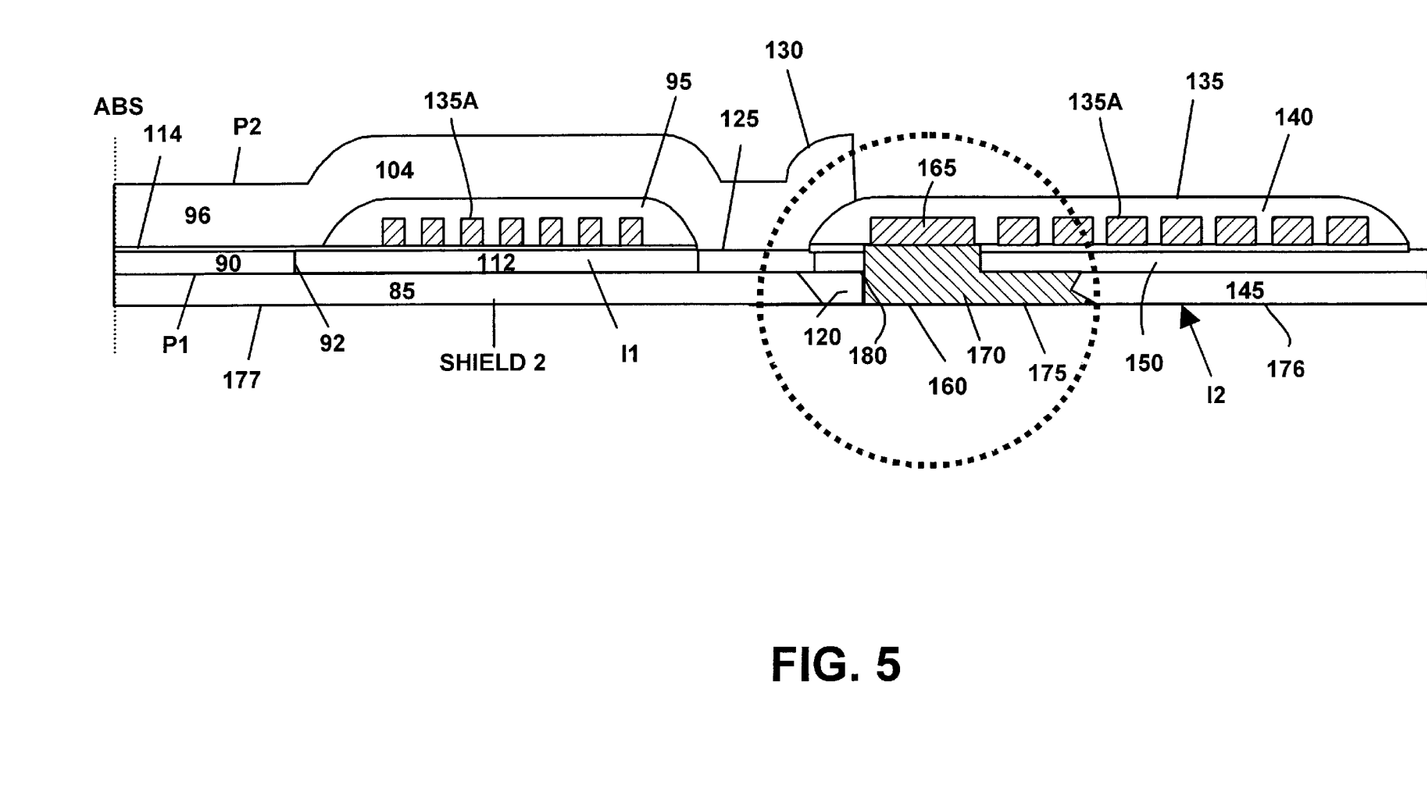
FIG. 5 is a cross-sectional, partly fragmentary view of the write head (with the read element not included) of FIG. 3 taken along line 4–4, and shown positioned relative to the data storage medium.

With reference to FIG. 5, the second pole layer 96 includes an edge 115 along which the second pole layer 96 is stitched to a top (or upper) yoke 104. The yoke 104 covers substantially the entire surface of the write coil 135 and a back gap region 125, and terminates at a forward-facing curved apex region 130.

A write circuit 100 (not shown) is connected to the write coil 135, and, during a write mode, it sends an electrical current $I_W$ to induce a flux flow through the write gap 114. Changes in the flux flow across the write gap 114 produce the different magnetic orientations of magnetized regions or domains in the disk 14 during a write operation.

An insulating layer 11 (also referenced by the numeral 112) is deposited between the write gap 114 and the second shield layer 85, and extends from the pedestal P1 back edge 92 over substantially the entire length of the write coil 135. The insulating layer 11 is made of insulating material, which may be similar or equivalent to that of the insulating layer 82. The thickness of the insulating layer 11 can be substantially the same as that of the pedestal P1.

The single layer coil 135 includes a plurality of multi-turned conductive coil elements (or conductors) 135A, only a few of which are illustrated for the purpose of clarity. The coil elements 135A are formed within an insulating layer 140.

A region intermediate to the write coil 135 and a single layer coil 135 is referred to as a back gap region 125. The back gap region 125 is formed substantially by an electrically and magnetically conductive material, which may be similar or equivalent to that of the second shield layer 85.

An insulating layer 12 (also referenced by the numeral 145) is formed over substantially the entire length of the single layer coil 135, starting at the sloped back edge 120 of the second shield layer 85. Another insulating layer 150 is immediately deposited on top of the insulating layer 12 over substantially the entire length of the single layer coil 135.

Separating the single layer coil 135 from the insulating layer 150 is another write gap 114, which has the same thickness and composition as those of the write gap 114.

A center tab 160 is embedded in the insulating layers 12 and 150 and electrically connects to the single layer coil 135. An upper portion 165 of the center tab 160 is formed within the insulating layer 140 of the single layer coil 135.

A lower portion 170 of the center tab 160 extends from the single layer coil 135 through the insulating layers 12 and 150. A bottom edge 175 of the lower portion 170 is formed flush with a lower surface 176 of the insulation layer 12. An opening 180 in the write gap 114 is referred to as a lead via. The center tab 160 provides electrical connection to the single layer coil 135.

Figure 6A:
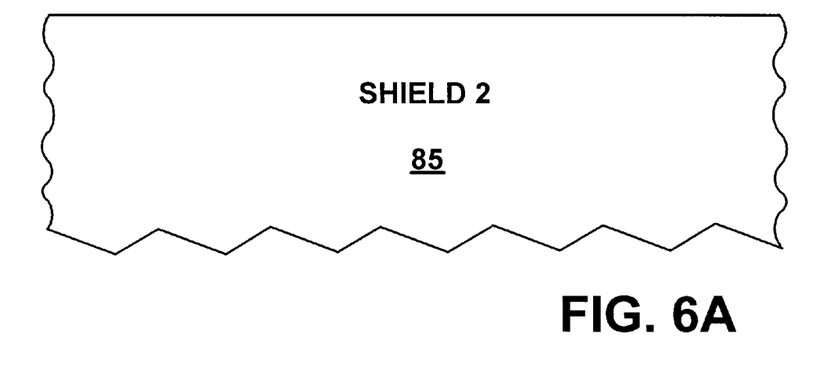
FIGS. 6A through 6H are schematic, side view illustrations of a sequence of steps implemented in the fabrication of the thin film write head of FIGS. 3 and 5.
Figure 6B:
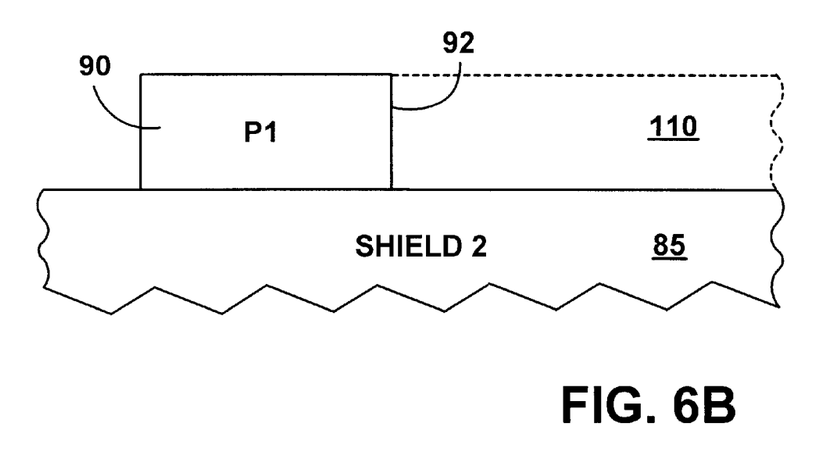

The fabrication process of the center tab 160 and the single layer coil 135 will now be described in connection with FIGS. 6A through 6H. With reference to FIG. 6A, the second shield layer 85 is formed using known or available thin film deposition techniques. The next step is illustrated in FIG. 6B, where a portion 110 (shown in dotted lines) of the second shield layer 85, is milled away to form the pedestal P1, and to define the back edge 92 with great precision. Alternatively, the pedestal P1 can be formed using pattern plating techniques, which would also form the zero throat level with great precision.

The back edge 92 defines the zero throat level of the read/write head 35. The zero throat level (also referenced herein by the numeral 92) lies in a well defined plane that is generally parallel to the plane of the air bearing surface ("ABS") level, which, in turn, is co-planar with the forward edge of the pedestal P1. The pole tip region of the read/write head 35 is defined as the region between the zero throat level and the ABS level.

The next step is to form the center tab 160 together with electrical interconnects for the read element 83 onto the write section 60 at the trailing edge of the second shield layer 85. The center tab 160 is located, in such a manner that the lower edge 175 of the lower portion 170 (FIG. 5) is co-planar with the lower surface 177 of the second shield layer 85.

Figure 6C:
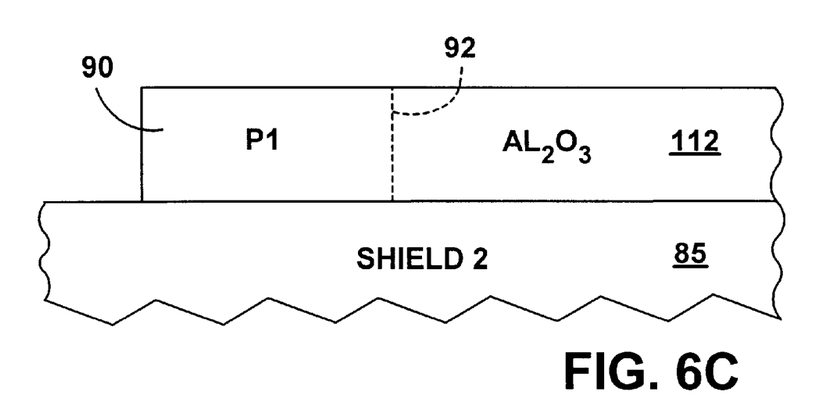

With reference to FIG. 6C, an insulating layer 112 (or 11) is deposited on the second shield layer 85, within the region 110 that has been milled away to define the pedestal P1 (FIG. 6B). FIG. 6C shows the insulating layer 112 as having been lapped to the same height as that of the pedestal P1. In addition, while in FIG. 6C, the back edge 92 of the pedestal P1 is shown in dotted lines as it is actually covered by the insulating layer 112, the back edge 92 will be represented by a solid line in subsequent FIGS. 6D through 6H for the purpose of clarity.

Figure 6D:
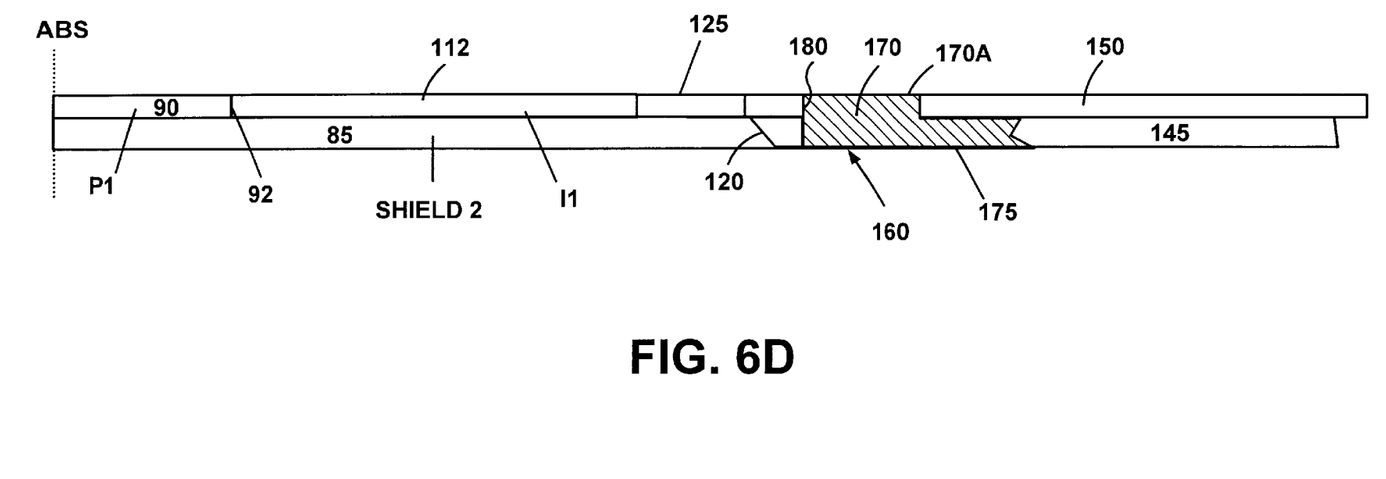

FIG. 6D complements FIG. 6C and illustrates an intermediary manufacturing step, prior to the lapping of the insulating layer 112, namely, the patterning of the lower portion 170 of the center tab 160. The advantage of forming the center tab 160 with the interconnects at this stage for the read element 83, is that several conventional wafer processing steps can now be eliminated, thereby significantly reducing the cycle time of wafer processing.

With reference to FIG. 6D, the insulating layer 150 can be processed concurrently with the insulating layer 112, and is deposited and lapped to maintain a flat surface that is substantially flush with the upper portion 170A of the center tab 160.

Figure 6E:
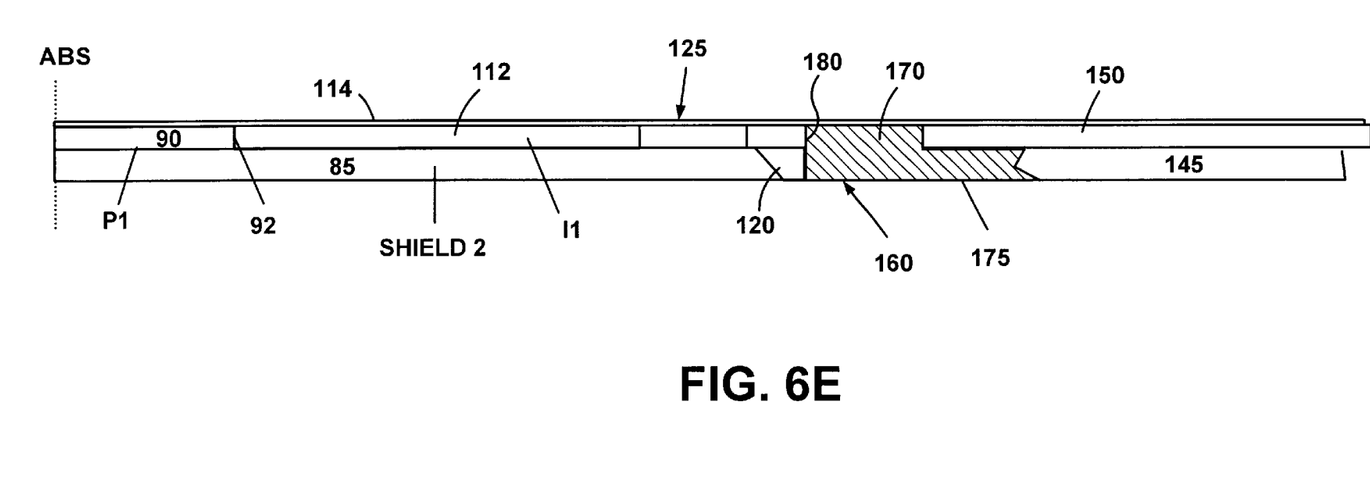

The next fabrication step is illustrated in FIG. 6E, wherein the write gap 114 is formed by depositing a thin, uniform, write gap 114 that separates the pedestal P1 from the top pole P2 (96). The write gap 114 covers substantially the entire surface of the pedestal P1 and the insulating layer 112. The thickness of the write gap 114 ranges between approximately 100 Angstroms and 10000 Angstroms, with the preferred range being 500 Angstroms and 2000 Angstroms.

Figure 6F:
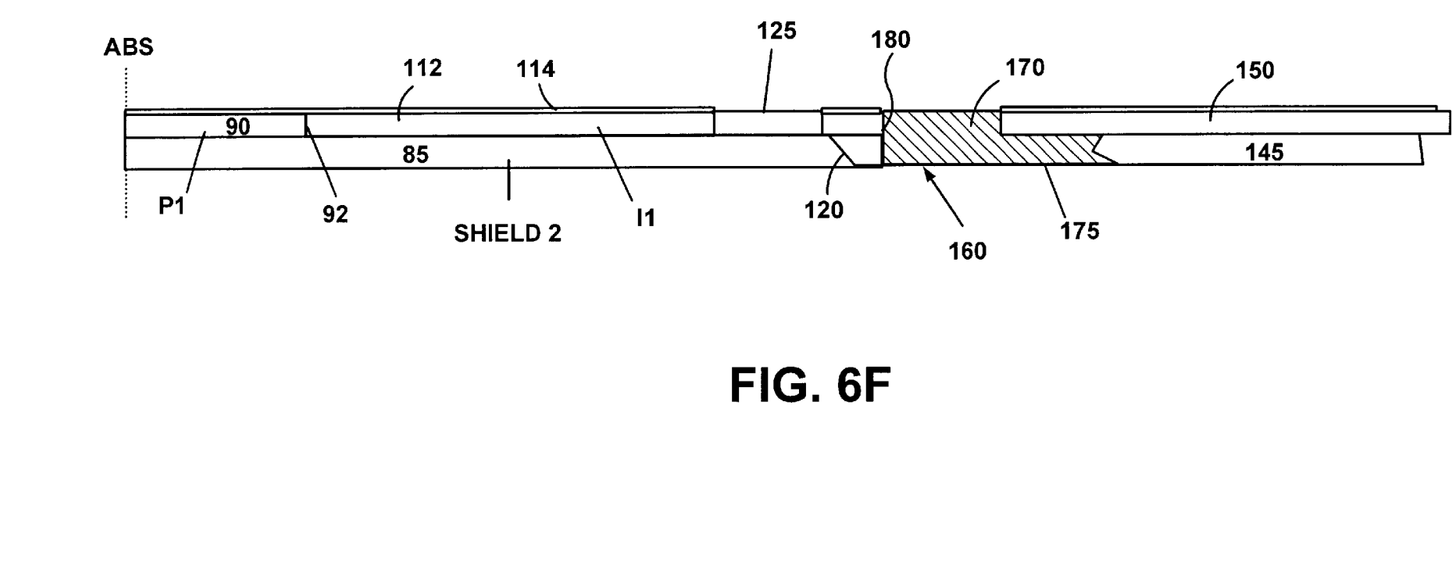

The write gap 114 is formed next by depositing a thin, uniform, insulating layer 190 that separates the insulating layer 150 from the single layer coil 135. The next fabrication step is illustrated in FIG. 6F, wherein the lead via 180 is formed by chemical etch.

Figure 6G:
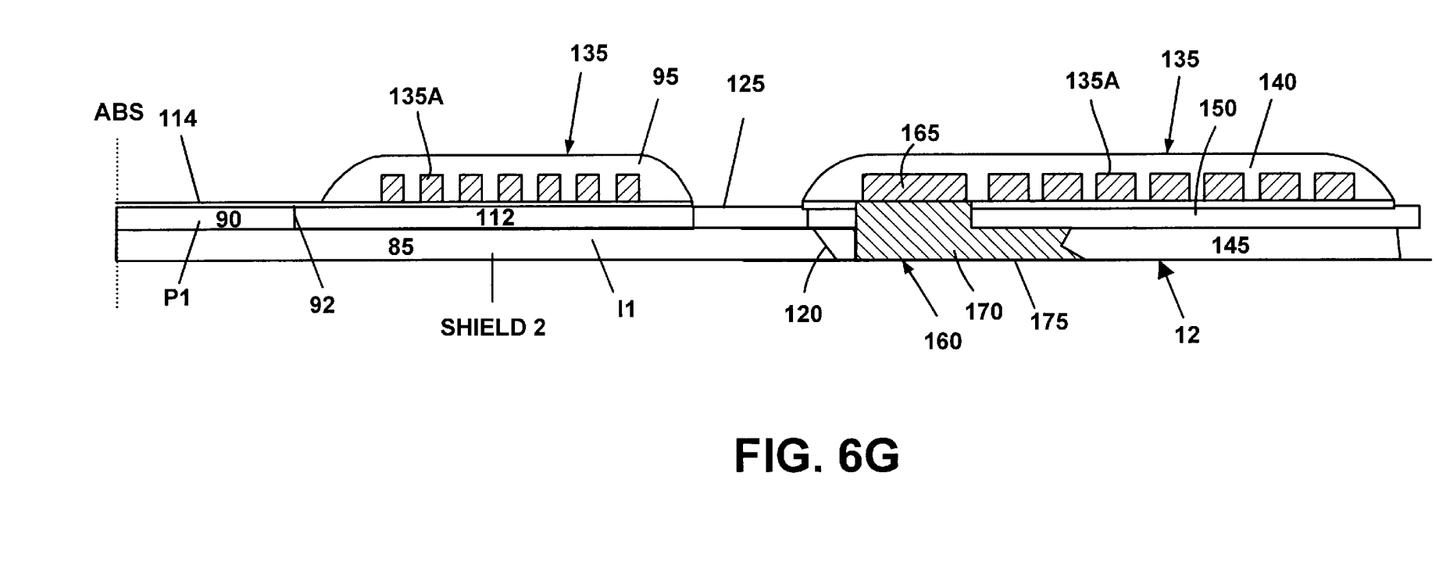

Next, and as illustrated in FIG. 6G, the write coil 135 comprised of the conductor elements 1 35A and the insulating layer 95, is formed on the write gap 114 at a distance from the second pole layer P2 (96).

Figure 6H:
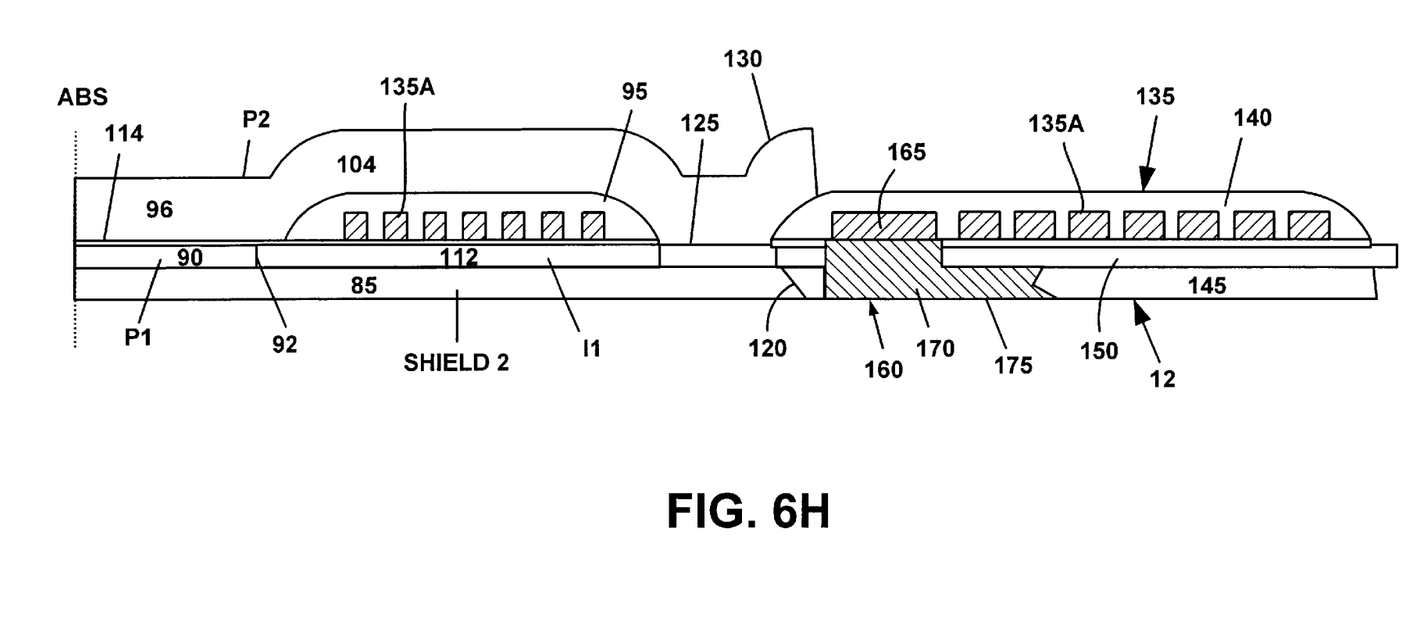

With reference to FIG. 6H the top pole P2 (96) is formed by depositing a film of magnetic material by means of known or available techniques, such as sputter deposition and etching, or pattern plating. After the top pole P2 is formed, it is etched or milled (using available or known techniques) such that the pattern of the top pole P2 is etched into the pedestal P1.

The fabrication process described herein will enable the single layer coil (135) resistance and inductance to be monitored for all the devices in wafer immediately after the coil fabrication, since the center tab 160 is formed before the conductor elements 135A of the single layer coil 135 is formed. The ability to monitor the coil resistance and inductance allow the manufacturer to screen defects in the manufacture process before final production, thereby improving yield by identifying additional processing or rework (such as coil seed removal) if necessary. The number of processing steps will also be reduced and therefore the manufacturing cycle time of wafer processing will be significantly shortened because the center tab 170 is processed concurrently with the interconnect, e.g. a lead that connects the read element 83 to a read circuit (not shown). By moving the center tab processing step prior to the processing step of the second pole layer P2, the chance of corrosion or delamination of the of the second pole layer P2 is considerably reduced.

It should be understood that the geometry, compositions, and dimensions of the elements described herein can be modified within the scope of the invention and are not intended to be the exclusive; rather, they can be modified within the scope of the invention.

What is claimed is:

1. A thin film head with a write section and a read section, for use in a data storage device, comprising:

a first pole P1 disposed in proximity to the read section;

a second pole P2 disposed on an opposite side of the read section, relative to the first pole P1;

a write gap formed between the first pole P1 and the second pole P2;

a coil formed of a single layer of conductors, an insulating layer that covers the conductors, a back gap region, and a center tab;

wherein the center tab is electrically conductive and comprises a lower portion and an upper portion:

wherein the upper portion of the center tab is formed atop the lower portion;

wherein the lower portion of the center tab is formed, at least in part, within the first pole P1;

wherein the lower portion comprises a lead via; and wherein the upper portion of the center tab is formed as part of the single layer of conductors.

2. The thin film head of claim 1, wherein the lower portion is connected to an external write circuit.

3. The thin film head of claim 1, wherein the insulating layer covers the first pole P1 and the center tab.

4. The thin film head of claim 1, wherein the lower portion comprises a bottom edge; and wherein the insulating layer comprises a lower surface.

5. The thin film head of claim 4, wherein the bottom edge of the lower portion is flush with the lower surface of the insulating layer.

6. A thin film head with a write section section and a read section, for use in a data storage device, made by a method comprising:

forming a first pole P1 in proximity to the read section;

forming a second pole P2 on an opposite side of the read section, relative to the first pole P1;

forming a backgap region;

forming a center tab via;

forming a center tab by depositing conductive material inside the center tab via; and then forming a coil in electrical connection with the center tab;

wherein the center tab is electrically conductive and comprises a lower portion and an upper portion:

wherein the upper portion of the center tab is formed atop the lower portion;

wherein the lower portion of the center tab is formed, at least in part, within the first pole P1;

wherein the lower portion comprises a lead via; and wherein the upper portion of the center tab is formed as part of the coil.

7. The thin film head of claim 6, wherein the method of making further includes forming an insulation layer over the first pole P1, the backgap region, and the center tab.

8. The thin film head of claim 7, wherein the method of making further includes forming a write gap.

9. The thin film head of claim 7, wherein the method of making further includes forming said second pole P2 and a write gap between the first pole P1 and the second pole P2.

10. The thin film head of claim 9, wherein forming the center tab includes forming the center tab via in proximity to the back gap region, prior to the formation of the conductors, the insulating layer, and the second pole P2.

* * * * *